(12) United States Patent
Shukla et al.

(10) Patent No.: US 11,487,797 B2
(45) Date of Patent: Nov. 1, 2022

(54) ITERATIVE APPLICATION OF A MACHINE LEARNING-BASED INFORMATION EXTRACTION MODEL TO DOCUMENTS HAVING UNSTRUCTURED TEXT DATA

(71) Applicant: Dell Products L.P., Round Rock, TX (US)

(72) Inventors: Ravi Shukla, Bangalore (IN); Jeffrey Scott Vah, Round Rock, TX (US); Jimmy Henry Wiggers, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 17/027,965

(22) Filed: Sep. 22, 2020

(65) Prior Publication Data
US 2022/0092095 A1    Mar. 24, 2022

(51) Int. Cl.
*G06F 16/33* (2019.01)
*G06F 16/34* (2019.01)
*G06N 20/00* (2019.01)

(52) U.S. Cl.
CPC ............ *G06F 16/334* (2019.01); *G06F 16/34* (2019.01); *G06N 20/00* (2019.01)

(58) Field of Classification Search
CPC ...... G06F 16/334; G06F 16/34; G06F 40/205; G06F 16/3344; G06F 16/3329;
(Continued)

(56) References Cited

U.S. PATENT DOCUMENTS

| 6,088,690 A | 7/2000 | Gounares et al. |
| 6,233,545 B1 | 5/2001 | Datig |

(Continued)

FOREIGN PATENT DOCUMENTS

WO   PCT/US2021/029554     6/2021

OTHER PUBLICATIONS

Quora, "What is doc2vec?" https://www.quora.com/What-is-doc2vec, Accessed Jul. 15, 2020, 3 pages.
(Continued)

*Primary Examiner* — Evan Aspinwall
(74) *Attorney, Agent, or Firm* — Ryan, Mason & Lewis, LLP

(57) ABSTRACT

An apparatus comprises a processing device configured to receive a query to extract information from a document, and to perform two or more iterations of utilizing a machine learning-based information extraction model to extract portions of unstructured text data from the document. In each iteration, a portion of the unstructured text data extracted from the document and an associated relevance score are output. In a first iteration, the query and document are input while in subsequent iterations the query and modified versions of the document are input, the modified versions having previously-extracted portions of the unstructured text data removed therefrom. The processing device is also configured to generate a response to the query comprising a subset of the portions of the unstructured text data extracted from the document determined to have associated relevance scores exceeding a threshold relevance score and at least a threshold level of similarity to the query.

20 Claims, 26 Drawing Sheets

(58) Field of Classification Search
CPC .......... G06N 20/00; G06N 5/022; G06N 3/08; G06N 5/04
USPC ........................................................ 707/769
See application file for complete search history.

(56) References Cited

U.S. PATENT DOCUMENTS

| | | | |
|---|---|---|---|
| 6,341,372 | B1 | 1/2002 | Datig |
| 6,745,161 | B1 | 6/2004 | Arnold et al. |
| 6,910,003 | B1 | 6/2005 | Arnold et al. |
| 7,143,091 | B2 | 11/2006 | Charnock et al. |
| 7,742,953 | B2 | 6/2010 | King et al. |
| 7,818,215 | B2 | 10/2010 | King et al. |
| 8,418,055 | B2 | 4/2013 | King et al. |
| 8,874,504 | B2 | 10/2014 | King et al. |
| 2002/0198697 | A1 | 12/2002 | Datig |
| 2003/0182310 | A1 | 9/2003 | Charnock et al. |
| 2005/0234707 | A1 | 10/2005 | Luo et al. |
| 2006/0004680 | A1 | 1/2006 | Robarts et al. |
| 2006/0253418 | A1 | 11/2006 | Charnock et al. |
| 2017/0212829 | A1 | 7/2017 | Bales et al. |
| 2017/0286396 | A1 | 10/2017 | Sandor et al. |
| 2020/0081972 | A1 | 3/2020 | Majumder et al. |
| 2020/0134012 | A1* | 4/2020 | Zakharov ............... G06N 20/00 |
| 2021/0157845 | A1* | 5/2021 | Dodel ................. G06F 16/3344 |

OTHER PUBLICATIONS

A. Navalakha, "NLP—Question Answering System using Deep Learning," https://medium.com/@akshaynavalakha/nlp-question-answering-system-f05825ef35c8, May 14, 2019, 8 pages.

Wikipedia, "BERT (language model)," https://en.wikipedia.org/w/index.php?title=BERT_(language_model)&oldid=966440321, Jul. 7, 2020, 4 pages.

Hugging Face, "Usage," https://huggingface.co/transformers/usage.html#question-answering, Accessed Jul. 15, 2020, 15 pages.

D. Neg, "Seq2Seq: The Clown Car of Deep Learning," https://medium.com/@devnag/seq2seq-the-clown-car-of-deep-learning-f88e1204dac3, Apr. 24, 2019, 7 pages.

M. Wadhwa, "Seq2Seq Model in Machine Learning," https://www.geeksforgeeks.org/seq2seq-model-in-machine-learning/, Dec. 5, 2018, 3 pages.

P. Goyal, "What is the Difference Between LSTM, RNN and Sequence to Sequence?," https://www.quora.com/What-is-the-difference-between-LSTM-RNN-and-sequence-to-sequence, Nov. 7, 2017, 2 pages.

M. Ma'amari, "NLP | Sequence to Sequence Networks| Part 2|Seq2seq Model (EncoderDecoder Model)," https://towardsdatascience.com/nlp-sequence-to-sequence-networks-part-2-seq2seq-model-encoderdecoder-model-6c22e29fd7e1, Nov. 5, 2018, 16 pages.

H. Lamba, "Intuitive Understanding of Attention Mechanism in Deep Learning," https://towardsdatascience.com/intuitive-understanding-of-attention-mechanism-in-deep-learning-6c9482aecf4f, Dec. 3, 2019, 24 pages.

G. Loye, "Attention Mechanism," https://blog.floydhub.com/attention-mechanism/, Sep. 15, 2019, 28 pages.

U.S. Appl. No. 16/522,217 filed in the name of Ravi Shukla et al. filed Jul. 25, 2019, and entitled "Encoding and Decoding Troubleshooting Actions with Machine Learning to Predict Repair Solutions."

U.S. Appl. No. 16/802,028 filed in the name of Jeffrey Scott Vah et al. filed Feb. 26, 2020, and entitled "Utilizing Machine Learning to Predict Success of Troubleshooting Actions for Repairing Assets."

* cited by examiner

Domain – Tech Support Logs

Question – "What is the issue?"

Threshold Score - 0.0001

Input Text
"Severity-Low OS: Windows 10 x64 Replace: Parts As Necessary No POST Troubleshooting Log : FOR DISPATCH - informed customer that based on the symptoms and on the results of troubleshooting, there are components inside the system that are non-functional and need to be replaced - informed customer that since the system has a Return to Repair Center warranty, we will need to send in the system to one of our repair center facilities for repairs and the turn-around time for the repair process would be 10-12 business days - customer confirmed and agreed to ABC service (General Incident ID: 12345678) Acquired Info; gave estimate; Tech Informed Educate customer about HDD data loss: CUSTOMER IS OKAY WITH HDD RE-IMAGE/REPLACEMENT AND AWARE OF DATA LOSS Info: John Doe, xxx-555-1234 Peter Smith, xxx-555-2345 123 Main Street, Town, State Physical address and phone number/s obtained and updated in service record Agent Description: Symptoms: Troubleshooting: Customer Process: n/a -Name: David - System: Model ABCD – Service Identifier: 12AB345 -Service Request:987654321TOADE Issue: No POST Input: customer said that he is getting a black screen after turning on the computer as per customer the power button and the keyboard lights up and after 10 seconds everything turns off customer said that he installed a test software before this occurred tried power drain tried known good power outlet switch two hard drives on two computers and the hard drive on the computer that is having problem is working fine on the other computer LCD Bist - Pass possible faulty MOBO offered Mail in service customer prefers to go back to the store first Diagnostic Used LCD BIST PASS Resolution: MAIL IN service REF Article: DEF12345 REF Linked: Yes Connect ID: n/a Email Address Obtained and Updated in service record Phone number obtained and updated in service record Overall Heat Check: Satisfied Self Rating: 7 Consulted: John Doe Test Email: N/A Email Received: N/A Call Duration: 19 mins and 24 sec ---- Received General Incident ID: 23456789 To: Support Email Support Email@Support.com Date: 12/25/2016 6:57 AM Subject: Re: Basic Warranty Support Service Request#: 987654321 Hello, I went back to the store and they tested it. It seems that the motherboard is dead. I would need to send it in for repairs. How do I do that?"

FIG. 4

ITERATION 1

| QUESTION | What is the issue? |
|---|---|
| EXTRACTED ANSWER | No POST |
| SCORE | 0.426639767 |
| SCORE>THRESHOLD(0.0001) | YES |
| SIMILARITY SCORE BETWEEN DOCUMENT VECTOR OF EXTRACTED ANSWER AND DOCUMENT VECTOR OF QUESTION > THRESHOLD(0) | YES |

ITERATION 2

| QUESTION | What is the issue? |
|---|---|
| EXTRACTED ANSWER | Customer said that he is getting a black screen after turning on the computer |
| SCORE | 0.032062736 |
| SCORE>THRESHOLD(0.0001) | YES |
| SIMILARITY SCORE BETWEEN DOCUMENT VECTOR OF EXTRACTED ANSWER AND DOCUMENT VECTOR OF QUESTION > THRESHOLD(0) | YES |

FIG. 5A

ITERATION 3

| QUESTION | What is the issue? |
|---|---|
| EXTRACTED ANSWER | The power button and the keyboard lights up |
| SCORE | 0.09033893 |
| SCORE>THRESHOLD(0.0001) | YES |
| SIMILARITY SCORE BETWEEN DOCUMENT VECTOR OF EXTRACTED ANSWER AND DOCUMENT VECTOR OF QUESTION > THRESHOLD(0) | YES |

ITERATION 19

| QUESTION | What is the issue? |
|---|---|
| EXTRACTED ANSWER | Email address obtained and updated in service record |
| SCORE | 0.18859047195792 |
| SCORE>THRESHOLD(0.0001) | YES |
| SIMILARITY SCORE BETWEEN DOCUMENT VECTOR OF EXTRACTED ANSWER AND DOCUMENT VECTOR OF QUESTION > THRESHOLD(0) | NO |

FIG. 5B 600-1

QUESTION: What is the issue?

| ITERATION NUMBER | EXTRACTED ANSWER | SCORE | VALID? |
|---|---|---|---|
| 1 | No POST | 0.426639767 | VALID |
| 2 | customer said that he is getting a black screen after turning on the computer | 0.032062736 | VALID |
| 3 | the power button and the keyboard lights up | 0.09033893 | VALID |
| 4 | It seems that the motherboard is dead. | 0.102493933 | VALID |
| 5 | Input: as per customer and after 10 seconds everything turned off | 0.163374972 | VALID |
| 6 | customer said that he installed a test software before this occurred | 0.106024732 | VALID |
| 7 | tried power drain | 0.435616513 | VALID |
| 8 | tried known good power outlet switch | 0.406884166 | VALID |
| 9 | two hard drives on two computers | 0.254711366 | VALID |
| 10 | the hard drive on the computer that is having problem is working fine | 0.041638241 | VALID |
| 11 | LCD Bist - Pass possible faulty MOBO | 0.103172387 | VALID |
| 12 | and on the other computer | 0.096844879 | VALID |
| 13 | offered Mail in service | 0.739457397 | NOT VALID |
| 14 | customer prefers to go back to the store first Diagnostic Used | 0.320459111 | VALID |
| 15 | LCD BIST PASS Resolution: MAIL IN service | 0.716698462 | VALID |
| 16 | REF Article: DEF12345 | 0.267970315 | NOT VALID |
| 17 | REF Linked: Yes | 0.250993258 | NOT VALID |
| 18 | Connect ID: n/a | 0.096901623 | NOT VALID |
| 19 | Email Address Obtained and Updated in service record | 0.188590472 | NOT VALID |
| 20 | Phone number obtained and updated in service record | 0.528637858 | NOT VALID |
| 21 | Overall Heat Check: Satisfied Self Rating: 7 | 0.289590982 | NOT VALID |
| 22 | Consulted: James Stevens | 0.04274835 | NOT VALID |
| 23 | Test Email: | 0.309669748 | NOT VALID |
| 24 | N/A Email Received: N/A | 0.320497271 | NOT VALID |
| 25 | Call Duration: 19 mins and 24 sec | 0.672712967 | NOT VALID |

| | QUESTION: What is the issue? | | |
|---|---|---|---|
| ITERATION NUMBER | EXTRACTED ANSWER | SCORE | VALID? |
| 26 | Issue: | 0.03059436 | VALID |
| 27 | data loss: | 0.077603838 | VALID |
| 28 | components inside the system that are non-functional and need to be replaced | 0.038569982 | VALID |
| 29 | DATA LOSS | 0.180629159 | VALID |
| 30 | CUSTOMER IS OKAY WITH HDD RE-IMAGE/REPLACEMENT | 0.068955293 | VALID |
| 31 | the system has a Return to Repair Center warranty, | 0.043875889 | VALID |
| 32 | No POST Troubleshooting | 0.001552166 | VALID |
| 33 | turn-around time for the repair process would be 10-12 business days | 0.001776113 | NOT VALID |
| 34 | based on the symptoms and on the results of troubleshooting, | 0.000344217 | VALID |
| 35 | Troubleshooting: | 0.00075848 | VALID |
| 36 | I would need to send it for repairs. | 0.001106703 | VALID |
| 37 | customer confirmed and agreed to ABC service | 0.000679136 | NOT VALID |
| 38 | send in the system to one of our repair center facilities for repairs | 0.001194966 | VALID |
| 39 | informed customer that there are - informed customer that since we will need to | 0.000650795 | NOT VALID |
| 40 | Customer Process: n/a | 0.004756783 | NOT VALID |
| 41 | Acquired Info; | 0.00127232 | NOT VALID |
| 42 | HDD | 0.000398273 | VALID |
| 43 | they tested it. | 0.000173313 | NOT VALID |
| 44 | Tech Informed Educate customer about AND AWARE OF INFO: | 0.000233347 | NOT VALID |
| 45 | Warranty | 0.000245771 | NOT VALID |
| 46 | Parts As Necessary Log : FOR DISPATCH | 0.000208862 | NOT VALID |
| 47 | (General | 0.000395904 | NOT VALID |
| 48 | Incident ID: 23456789 gave estimate; | 0.000427809 | NOT VALID |
| 49 | General | 0.001649381 | NOT VALID |
| 50 | Symptoms: | 0.000834958 | VALID |

FIG. 6B 600-3

| ITERATION NUMBER | QUESTION: What is the issue? | | |
|---|---|---|---|
| | EXTRACTED ANSWER | SCORE | VALID? |
| 51 | Basic Support Service Request #: | 0.000576279 | NOT VALID |
| 52 | 987654321 Hello, I went back to the store | 0.002955801 | NOT VALID |
| 53 | Physical address and phone number/s obtained and updated in service record | 0.006049186 | NOT VALID |
| 54 | -Service Request:987654321TOADE | 0.026295907 | NOT VALID |
| 55 | Teddy | 0.020160501 | NOT VALID |
| 56 | Subject: Re: and How do I do that? | 0.001333339 | NOT VALID |
| 57 | Incident | 0.002492281 | NOT VALID |
| 58 | Windows 10 x64 Replace: | 0.002412127 | VALID |
| 59 | Description: -Name: David | 0.004420993 | NOT VALID |
| 60 | System: | 0.001849832 | VALID |
| 61 | Severity-Low OS: | 0.003133063 | NOT VALID |
| 62 | 12/25/2016 | 0.004505261 | NOT VALID |
| 63 | - and the - xxxx, | 0.001747475 | NOT VALID |
| 64 | Date: 6:57 AM | 0.003006676 | NOT VALID |
| 65 | Support_Email | 0.001790165 | NOT VALID |
| 66 | Support_Email@Support.com | 0.006161863 | NOT VALID |
| 67 | 12AB345 | 0.002182132 | NOT VALID |
| 68 | xxxx – MODEL ABCD –Service Identifier: | 0.011089085 | NOT VALID |
| 69 | Town, | 0.002771619 | NOT VALID |
| 70 | xxx-555-2345 123 Main Street | 0.004539074 | NOT VALID |
| 71 | ----- Received General Incident ID: 23456789 | 0.005537052 | NOT VALID |
| 72 | Peter Smith, | 0.009149404 | NOT VALID |
| 73 | xxx-555-1234 | 0.005345512 | NOT VALID |
| 74 | To: | 0.005294695 | NOT VALID |
| 75 | OR | 0.000007204 | NOT VALID |

FIG. 6C

QUESTION: What is the issue?

FINAL ANSWER:
No POST customer said that he is getting a black screen after turning on the computer the power button and the keyboard lights up It seems that the motherboard is dead. Input: as per customer and after 10 seconds everything turned off customer said that he installed a test software before this occurred tried power drain tried known good power outlet switch two hard drives on two computers the hard drive on the computer that is having problem is working fine LCD Bist - Pass possible faulty MOBO and on the other computer customer prefers to go back to the store first Diagnostic Used LCD BIST PASS Resolution: MAIL IN service Issue: data loss: components inside the system that are non-functional and need to be replaced DATA LOSS CUSTOMER IS OKAY WITH HDD RE-IMAGE/REPLACEMENT the system has a Return to Repair Center warranty, No POST Troubleshooting based on the symptoms and on the results of troubleshooting, Troubleshooting: I would need to send it for repairs. send in the system to one of our repair center facilities for repairs HDD Symptoms: Windows 10 x64 Replace: System:

QUESTION: What is the problem?

| ITERATION NUMBER | EXTRACTED ANSWER | SCORE | VALID? |
|---|---|---|---|
| 1 | the power button and the keyboard lights up | 0.024199786 | VALID |
| 2 | motherboard is dead. | 0.019961686 | VALID |
| 3 | working fine on the other computer | 0.009974053 | VALID |
| 4 | LCD Bist - Pass possible faulty | 0.207354423 | VALID |
| 5 | MOBO offered Mail in service | 0.313486304 | VALID |
| 6 | customer prefers to go back to the store first Diagnostic | 0.116786831 | VALID |
| 7 | No POST | 0.012295063 | VALID |
| 8 | getting a black screen | 0.028051733 | VALID |
| 9 | hard drive on the computer that is having problem | 0.008383294 | VALID |
| 10 | after turning on the computer | 0.072857772 | VALID |
| 11 | power drain | 0.179110411 | VALID |
| 12 | components inside the system that are non-functional and need to be replaced | 0.060196818 | VALID |
| 13 | It seems that the I would need to send it for repairs. | 0.216940199 | VALID |
| 14 | he is as per customer and after 10 seconds everything turned off | 0.124375579 | VALID |
| 15 | data loss: | 0.033040338 | VALID |
| 16 | DATA LOSS | 0.045367251 | VALID |
| 17 | the system has a Return to Repair Center warranty, | 0.026278271 | VALID |
| 18 | CUSTOMER IS OKAY WITH HDD RE-IMAGE/REPLACEMENT | 0.051143454 | VALID |
| 19 | Customer Process: n/a | 0.022397757 | NOT VALID |
| 20 | Troubleshooting: | 0.001597087 | VALID |
| 21 | Input: | 0.00427035 | NOT VALID |
| 22 | installed a test software | 0.025802689 | VALID |
| 23 | power outlet switch | 0.014158966 | VALID |
| 24 | two hard drives on two computer and the is Used | 0.013528752 | VALID |
| 25 | customer said that customer said that he before this occurred | 0.00238014 | NOT VALID |

FIG. 7A 700-2

QUESTION: What is the problem?

| ITERATION NUMBER | EXTRACTED ANSWER | SCORE | VALID? |
|---|---|---|---|
| 26 | tried known good LCD | 0.383238205 | VALID |
| 27 | BIST PASS Resolution: MAIL IN service | 0.309511185 | VALID |
| 28 | REF | 0.0053338433 | NOT VALID |
| 29 | DEF12345 | 0.122799332 | NOT VALID |
| 30 | Article: REF | 0.017648663 | NOT VALID |
| 31 | Issue: Linked: Yes | 0.036389707 | VALID |
| 32 | Parts As Necessary | 0.000880822 | NOT VALID |
| 33 | No | 0.040536125 | NOT VALID |
| 34 | turn-around time for the repair process would be 10-12 business days | 0.001684385 | VALID |
| 35 | Physical address and phone number/s obtained and updated in service record | 0.00378648 | NOT VALID |
| 36 | Symptoms: -Name: David | 0.029929987 | VALID |
| 37 | Overall Heat Check: Satisfied Self Rating: 7 | 0.0091184185 | NOT VALID |
| 38 | need to send in the system to one of our repair center facilities for repairs | 0.0039923809 | VALID |
| 39 | based on the symptoms and on the results of troubleshooting, | 0.000352183 | VALID |
| 40 | informed customer | 0.000116443 | NOT VALID |
| 41 | informed customer | 0.00237097 | NOT VALID |
| 42 | there are - that since we will and the – customer | 0.00511558 | NOT VALID |
| 43 | Acquired Info; | 0.001389694 | NOT VALID |
| 44 | they tested it. | 0.000002643 | NOT VALID |

QUESTION: What is the trouble?

| ITERATION NUMBER | EXTRACTED ANSWER | SCORE | VALID? |
|---|---|---|---|
| 1 | the power button and the keyboard lights up | 0.031079398 | VALID |
| 2 | motherboard is dead. | 0.040066933 | VALID |
| 3 | getting a black screen after turning on the computer | 0.010715538 | VALID |
| 4 | components inside the system that are non-functional and need to be replaced | 0.005847799 | VALID |
| 5 | It seems that the I would need to send it for repairs. | 0.011461452 | VALID |
| 6 | No POST | 0.010266836 | VALID |
| 7 | problem is working fine on the other computer | 0.014648415 | VALID |
| 8 | possible faulty | 0.029128787 | VALID |
| 9 | he is as per customer and after 10 seconds everything turned off | 0.033179643 | VALID |
| 10 | tried power drain | 0.14929743 | VALID |
| 11 | I went back to the store and they tested it. | 0.031426508 | VALID |
| 12 | CUSTOMER IS OKAY WITH HDD RE-IMAGE/REPLACEMENT | 0.012538999 | VALID |
| 13 | customer prefers to go back to the store first Diagnostic | 0.016756101 | VALID |
| 14 | installed a test software before this occurred | 0.045300852 | VALID |
| 15 | power outlet switch | 0.03288238 | VALID |
| 16 | the system has a Return to Repair Center warranty, | 0.020368672 | VALID |
| 17 | HDD data loss: | 0.013693928 | VALID |
| 18 | DATA LOSS | 0.163187627 | VALID |
| 19 | Customer Process: n/a | 0.02106368 | NOT VALID |
| 20 | two hard drives on two computers | 0.00089138 | VALID |

FIG. 8A

QUESTION: What is the trouble?

| ITERATION NUMBER | EXTRACTED ANSWER | SCORE | VALID? |
|---|---|---|---|
| 21 | the hard drive | 0.003045897 | VALID |
| 22 | turn-around time for the repair process would be 10-12 business days | 0.000626709 | VALID |
| 23 | Input: customer said that customer said that he tried known good | 0.007154277 | VALID |
| 24 | Issue: and on the computer that is having LCD Bist – Pass | 0.026548772 | VALID |
| 25 | Troubleshooting: | 0.002862543 | VALID |
| 26 | Parts As Necessary No POST Troubleshooting | 0.001155077 | VALID |
| 27 | -Name: David | 0.020817299 | NOT VALID |
| 28 | Symptoms: - System: MODEL ABCD | 0.006603395 | VALID |
| 29 | we will need to send in the system to one of our repair center facilities | 0.004631066 | VALID |
| 30 | Overall Heat Check: Satisfied Self Rating: 7 | 0.000592131 | NOT VALID |
| 31 | troubleshooting, | 0.000775254 | VALID |
| 32 | informed customer that based on the symptoms | 0.000523991 | NOT VALID |
| 33 | informed customer | 0.009987593 | NOT VALID |
| 34 | since for repairs and the - customer confirmed and agreed to ABC service | 0.007657108 | VALID |
| 35 | Acquired Info: | 0.018990817 | NOT VALID |
| 36 | gave estimate; | 0.001319205 | NOT VALID |
| 37 | Tech Informed Educate customer about AND AWARE OF INFO: | 0.002458178 | NOT VALID |
| 38 | FOR DISPATCH | 0.002526524 | NOT VALID |
| 39 | on the results | 0.000119178 | NOT VALID |
| 40 | Physical address and phone number/s obtained and updated in service record | 0.000028335 | NOT VALID |

FIG. 8B

Domain – Tech Support Logs

Question – "What is the issue"

Threshold Score – 0.0001

Input Text
"replace charging issue / battery issue plug in not charging/ battery end of usable life, ac adapter not installed va error 2000 0132 va 110392, unable to bios update due to low charge, no known good ac adapter, cid and data loss inform, est, no apn, please replace the battery, ac adapter and dc in port if necessary and check the of the computer before sending to premises"

FIG. 9A

QUESTION: What is the issue? — 905

| ITERATION NUMBER | EXTRACTED ANSWER | SCORE | VALID? | PREDICTED CATEGORY |
|---|---|---|---|---|
| 1 | replace charging issue / battery issue | 0.113275748 | VALID | SYMPTOM |
| 2 | low charge, | 0.073227632 | VALID | SYMPTOM |
| 3 | plug in not charging/ battery end of usable life, | 0.033291111 | VALID | SYMPTOM |
| 4 | no known good ac adapter, | 0.091953014 | VALID | ATTRIBUTE |
| 5 | cid and data loss | 0.573157084 | VALID | SYMPTOM |
| 6 | unable to bios update | 0.103785997 | VALID | REPAIR |
| 7 | no apn, please | 0.102288418 | NOT VALID | SYMPTOM |
| 8 | ac adapter not installed | 0.197062295 | VALID | SYMPTOM |
| 9 | va error 2000 0132 va 110392, due to inform, | 0.258114489 | VALID | SYMPTOM |
| 10 | replace the battery, ac adapter and dc in port if necessary | 0.166629812 | VALID | SYMPTOM |
| 11 | check the of the computer | 0.191275234 | VALID | DIAGNOSTIC |
| 12 | before sending to premises | 0.059460117 | NOT VALID | SYMPTOM |
| 13 | est, | 0.017816945 | NOT VALID | SYMPTOM |
| 14 | and | 0.000225277 | NOT VALID | SYMPTOM |

FIG. 9B

QUESTION: What is the issue?

| ITERATION NUMBER | ANSWER EXTRACTED | SCORE | VALID? |
|---|---|---|---|
| 1 | replace charging issue / battery issue | 0.113275748 | VALID |
| 2 | low charge, | 0.0733227632 | VALID |
| 3 | plug in not charging/ battery end of usable life, | 0.033291111 | VALID |
| 4 | no known good ac adapter, | 0.091953014 | VALID |
| 5 | cid and data loss | 0.573157084 | VALID |
| 6 | unable to bios update | 0.103785997 | VALID |
| 7 | no apn, please | 0.102288418 | NOT VALID |
| 8 | ac adapter not installed | 0.197062295 | VALID |
| 9 | va error 2000 0132 va 110392, due to inform, | 0.258114489 | VALID |
| 10 | replace the battery, ac adapter and dc in port if necessary | 0.166629812 | VALID |
| 11 | check the of the computer | 0.191275234 | VALID |
| 12 | before sending to premises | 0.059460117 | NOT VALID |
| 13 | est, | 0.017816945 | NOT VALID |
| 14 | and | 0.000225277 | NOT VALID |

Precision = 70% (10/14)
Recall = 100% (10/10)

FIG. 10A

| ITERATION NUMBER | QUESTION: What is the issue? | | |
|---|---|---|---|
| | ANSWER EXTRACTED | SCORE | VALID? |
| 1 | replace charging issue / battery issue | 0.113275748 | VALID |
| 1 | issue / battery issue | 0.0732227632 | VALID (INCOMPLETE) |
| 1 | battery issue | 0.065291111 | VALID (INCOMPLETE) |
| 1 | no known good ac adapter | 0.053953014 | VALID |
| 1 | good ac adapter | 0.0431570084 | VALID(INCOMPLETE) |
| 1 | ac adapter | 0.040785997 | VALID (INCOMPLETE) |
| 1 | unable to bios update | 0.0322884183 | VALID |
| 1 | Unable to bios | 0.0250622955 | VALID (INCOMPLETE) |

Precision = 38% (3/8)
Recall = 30% (3/10)

FIG. 10B

Domain – News Article

Question – " How did Entity_A help the film school?"

Input Text

"'Entity_A is helping students from Sample Film School (SFS) keep their creative pursuits on track whether they're in the physical or virtual classroom. With powerful Entity_A workstations – combined with Entity_A infrastructure solutions on the backend – students can access the latest technology for their graphics-intensive curriculum, even when quickly transitioning to a remote learning environment. SFS is one of the most distinguished entertainment arts schools in the world, offering year-long programs for around 1,500 students across eight campuses. SFS students create hundreds of productions every year, with the curriculum spanning Film Production, 3D Animation & Visual Effects, Digital Design, Game Design, and VR/AR Design & Development. Their alumni have gone on to be some of the most sought-after artists, creators and storytellers in the industry. SFS was in the process of deploying hundreds of Entity_A's workstations and displays for their on-campus teaching labs when they quickly pivoted to a remote learning environment. This virtual setup needed to be accessible to all teachers and students, including those students that had returned to their homes outside of Example_City. The IT department faced two primary obstacles as they started evaluating remote learning needs. First, access to the latest technology. Direct production opportunities and access to industry-leading instruction is what attracts students to SFS, so it was critical to provide the same technology to create innovative content in 6k, 4k and AR/VR. Second, minimal disruption to students. One of the unique elements of the school's curriculum is that classes run 9am – 10pm every day, with courses starting every two months and lasting up to a year. This meant there was no time to waste for the IT department. Learning from leading global production studios supporting remote workforces, SFS deployed 900 Entity_A workstations with Model_X GPUs in their labs in a week and a half. By week two, SFS had combined the workstations with remote protocol solutions, giving most students remote access to their workstations and virtual access to the curriculum. Loaner PCs and monitors were shipped to students who lacked the technology to complete their learning and coursework from home. SFS students know they are getting access to not only the best teachers, but also the most powerful and reliable technology built to bring their ideas to life, said John Doe, head of Information Technology, SFS. Without a doubt, this has been one of the most challenging and rewarding experiences in my career. Although we were already on a digital transformation journey, the unexpected happened, and were proud of what we managed to achieve within a couple of weeks with Entity_A. Regardless of where the learning happens, SFS students have access to consistent, reliable and powerful technology. With enterprise-class components and extensive software certifications on Entity_A workstations, SFS students can now use creative applications from home. SFS also benefitted from Entity_A optimization features, which dynamically optimizes the systems performance using Artificial Intelligence. SFS was able to examine system performance metrics to identify and remove bottlenecks. Combined with Model_X GPUs that provide accelerated ray tracing and AI, the deployed Entity_A workstations cut render times by 60 percent* and have allowed students to easily apply special effects techniques prevalent in games and movies today. SFS is a great example of virtual learning done right, and it will help prepare the next-generation of professionals for creating in remote environments, said Jane Smith, vice president, Commercial Client Solutions – Specialty, Entity_A. The combination of clear strategy setting, strong communication and integrated technology solutions provided the recipe for success during these unexpected circumstances. Entity_A's workstations are the workstation of choice for professional creators and production studios, vfx specialists and game developers. Entity_A's creative solutions have been used to help some of the world's leading studios integrate onsite and remote environments, even when handling large volumes of high-resolution and sensitive content."

FIG. 11

| QUESTION: How did Entity_A help the film school? |||||
|---|---|---|---|---|
| ITERATION NUMBER | EXTRACTED ANSWER | SCORE | >THRESHOLD (0.01) | VALID? |
| 1 | keep their creative pursuits on track whether they're in the physical or virtual classroom. | 0.359747082 | YES | VALID |
| 2 | powerful Entity_A workstations | 0.230314672 | YES | VALID |
| 3 | students can access the latest technology for their graphics-intensive curriculum, | 0.1171162354 | YES | VALID |
| 4 | it will help prepare the next-generation of professionals for creating in remote environments, | 0.1210091545 | YES | VALID |
| 5 | virtual learning done right, | 0.176792547 | YES | VALID |
| 6 | integrate onsite and remote environments, | 0.054660425 | YES | VALID |
| 7 | Entity_A infrastructure solutions | 0.009574601 | NO | - |

1200

QUESTION: How did Entity_A help the film school?

FINAL ANSWER:
keep their creative pursuits on track whether they're in the physical or virtual classroom. powerful Entity_A workstations students can access the latest technology for their graphics-intensive curriculum, it will help prepare the next-generation of professionals for creating in remote environments, virtual learning done right, integrate onsite and remote environments,

QUESTION: How did Entity_A help the film school?

| ITERATION NUMBER | EXTRACTED ANSWER | SCORE | >THRESHOLD (0.001) | VALID? |
|---|---|---|---|---|
| 1 | keep their creative pursuits on track whether they're in the physical or virtual classroom. | 0.359747082 | YES | VALID |
| 2 | powerful Entity_A workstations | 0.230314672 | YES | VALID |
| 3 | students can access the latest technology for their graphics-intensive curriculum, | 0.117162354 | YES | VALID |
| 4 | it will help prepare the next-generation of professionals for creating in remote environments, | 0.121091545 | YES | VALID |
| 5 | virtual learning done right, | 0.176792547 | YES | VALID |
| 6 | integrate onsite and remote environments, | 0.054660425 | YES | VALID |
| 7 | Entity_A infrastructure solutions | 0.009574601 | YES | VALID |
| 8 | offering year-long programs for around 1,500 students across eight campuses. | 0.037655771 | YES | NOT VALID |
| 9 | create hundreds of productions every year, | 0.026695671 | YES | VALID |
| 10 | one of the most distinguished entertainment arts schools in the world, | 0.084759399 | YES | NOT VALID |

| ITERATION NUMBER | QUESTION: How did Entity_A help the film school? | | | |
|---|---|---|---|---|
| | EXTRACTED ANSWER | SCORE | >THRESHOLD (0.001) | VALID? |
| 11 | Entity_A | 0.019137716 | YES | VALID |
| 12 | The combination of clear strategy setting, strong communication and integrated technology solutions | 0.008691136 | YES | VALID |
| 13 | provided the recipe for success during these unexpected circumstances. | 0.288026959 | YES | VALID |
| 14 | allowed students to easily apply special effects techniques prevalent in games and movies today. | 0.019630222 | YES | VALID |
| 15 | when handling large volumes of high-resolution and sensitive content. | 0.006767637 | YES | VALID |
| 16 | Entity_A's creative solutions | 0.002201888 | YES | VALID |
| 17 | one of the most challenging and rewarding experiences | 0.001897829 | YES | VALID |
| 18 | pivoted to a remote learning environment. | 0.001474684 | YES | VALID |
| 19 | virtual setup needed to be accessible to all teachers and students, | 0.000910874 | NO | - |

FIG. 13B

QUESTION: How did Entity_A help the film school?

FINAL ANSWER:
keep their creative pursuits on track whether they're in the physical or virtual classroom. powerful Entity_A workstations students can access the latest technology for their graphics-intensive curriculum, it will help prepare the next-generation of professionals for creating in remote environments, virtual learning done right, integrate onsite and remove environments, Entity_A infrastructure solutions Entity A The combination of clear strategy setting, strong communication and integrated technology solutions provided the recipe for success during these unexpected circumstances. allowed students to easily apply special effects techniques prevalent in games and movies today. when handling large volumes of high-resolution and sensitive content. Entity A's creative solutions one of the most challenging and rewarding experiences pivoted to a remote learning environment.

ITERATIVE APPLICATION OF A MACHINE LEARNING-BASED INFORMATION EXTRACTION MODEL TO DOCUMENTS HAVING UNSTRUCTURED TEXT DATA

FIELD

The field relates generally to information processing, and more particularly to techniques for managing data.

BACKGROUND

In many information processing systems, data stored electronically is in an unstructured format, with documents comprising a large portion of unstructured data. Collection and analysis, however, may be limited to highly structured data, as unstructured text data requires special treatment. For example, unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present invention provide techniques for iterative application of a machine learning-based information extraction model to documents having unstructured text data.

In one embodiment, an apparatus comprises at least one processing device comprising a processor coupled to a memory. The at least one processing device is configured to perform the steps of receiving a query to extract information from a document, the document comprising unstructured text data, and performing two or more iterations of utilizing a machine learning-based information extraction model to extract portions of unstructured text data from the document. In each of the two or more iterations, the machine learning-based information extraction model provides as output a portion of the unstructured text data extracted from the document and a relevance score associated with the portion of the unstructured text data extracted from the document in that iteration. In a first one of the two or more iterations, the machine learning-based information extraction model takes as input the query and the document. In subsequent ones of the two or more iterations, the machine learning-based information extraction model takes as input the query and a modified version of the document with one or more portions of the unstructured text data of the document extracted in one or more previous ones of the two or more iterations removed therefrom. The at least one processing device is also configured to perform the steps of determining whether the portions of the unstructured text data extracted from the document in the two or more iterations have an associated relevance score exceeding a threshold relevance score and at least a threshold level of similarity to the query and generating a response to the query, the response to the query comprising a subset of the portions of the unstructured text data extracted from the document in the two or more iterations determined to have associated relevance scores exceeding the threshold relevance score and at least the threshold level of similarity to the query.

These and other illustrative embodiments include, without limitation, methods, apparatus, networks, systems and processor-readable storage media.

BRIEF DESCRIPTION OF THE DRAWINGS

FIG. 4 shows an example of unstructured text data in an illustrative embodiment.

FIGS. 5A and 5B illustrate iterations of recursively applying the question answering deep learning model of FIG. 3 to the unstructured text data of FIG. 4 using an input question in an illustrative embodiment.

FIGS. 6A-6D show a table of answers extracted from the unstructured text data of FIG. 4 using recursive application of the question answering deep learning model of FIG. 3 with an input question to produce a final answer in an illustrative embodiment.

FIGS. 7A and 7B show a table of answers extracted from the unstructured text data of FIG. 4 using recursive application of the question answering deep learning model of FIG. 3 with another input question to produce a final answer in an illustrative embodiment.

FIGS. 8A and 8B show a table of answers extracted from the unstructured text data of FIG. 4 using recursive application of the question answering deep learning model of FIG. 3 with another input question to produce a final answer in an illustrative embodiment.

FIGS. 9A and 9B show another example of unstructured text data and a table of answers extracted from the unstructured text data using recursive application of the question answering deep learning model of FIG. 3 in an illustrative embodiment.

FIGS. 10A and 10B illustrate improved performance of recursive application of a question answering model relative to non-recursive application of a question answering model in an illustrative embodiment.

FIG. 11 shows another example of unstructured text data in an illustrative embodiment.

FIG. 12 shows a table of answers extracted from the unstructured text data of FIG. 11 using a first threshold with recursive application of the question answering deep learning model of FIG. 3 with an input question to produce a final answer in an illustrative embodiment.

FIGS. 13A-13C show a table of answers extracted from the unstructured text data of FIG. 11 using a second threshold with recursive application of the question answering deep learning model of FIG. 3 with an input question to produce a final answer in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1A:
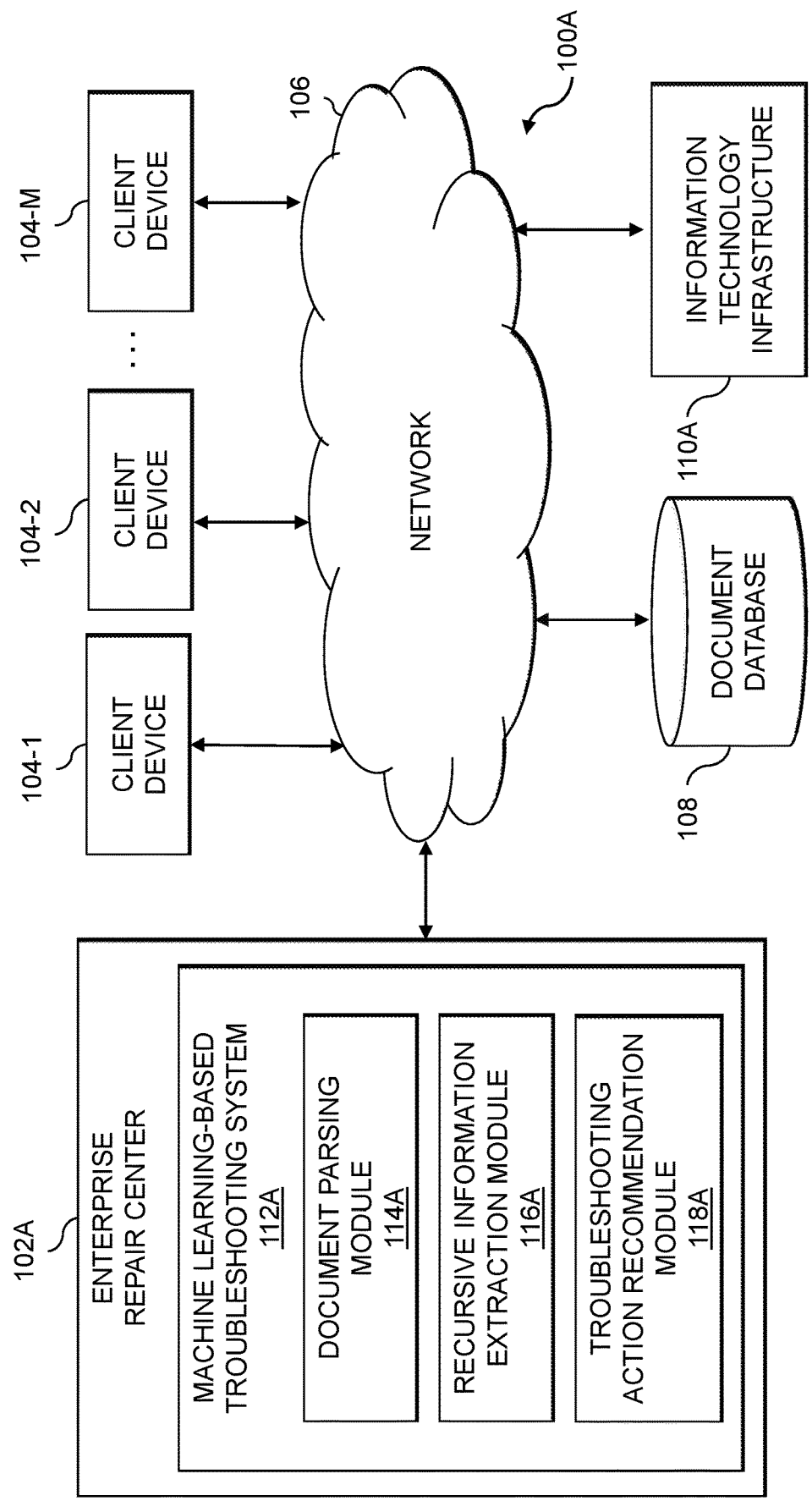
FIGS. 1A and 1B are block diagrams of information processing systems for iterative application of a machine learning-based information extraction model to documents having unstructured text data in an illustrative embodiment of the invention.
Figure 1B:
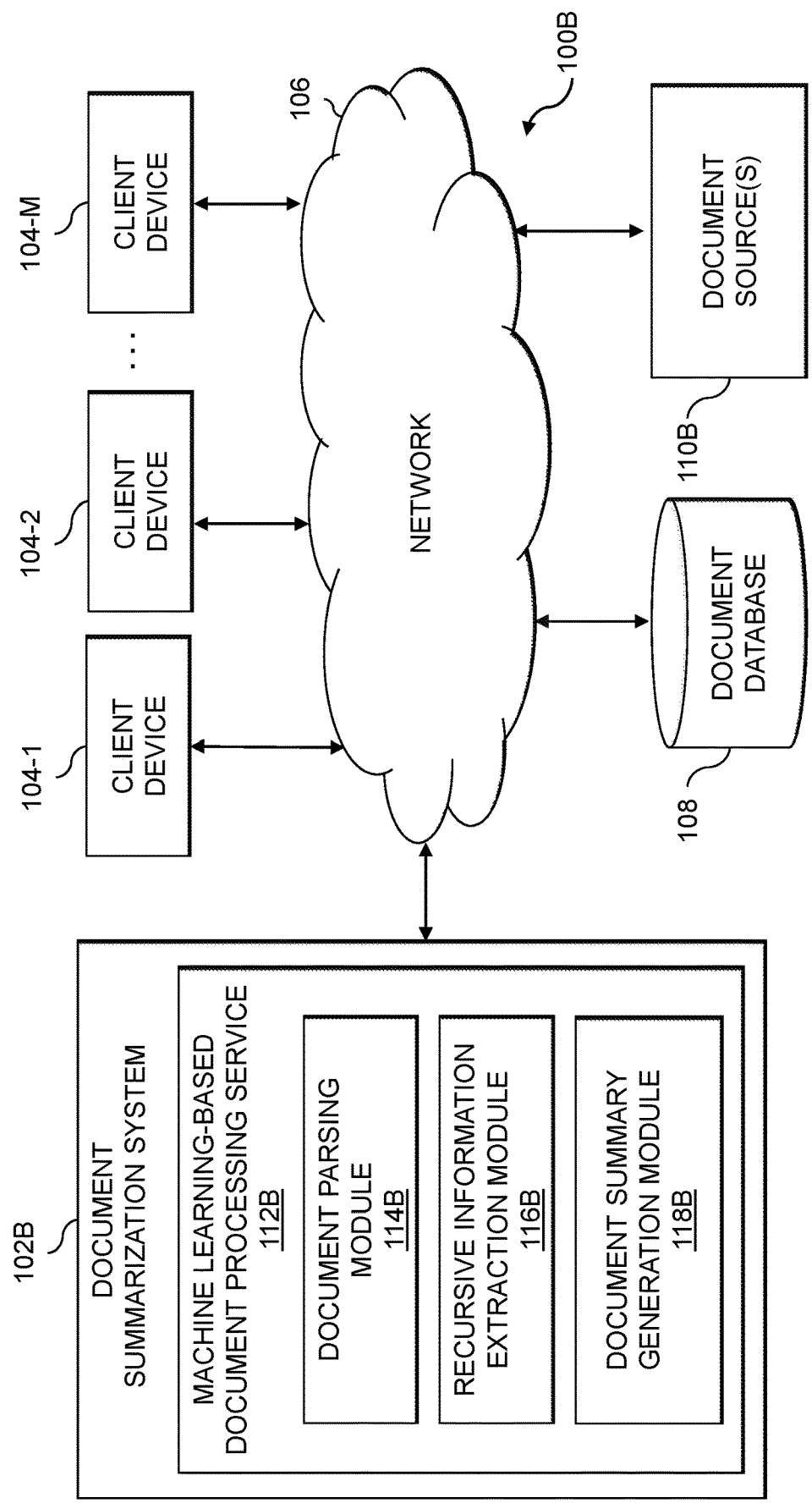

FIGS. 1A and 1B show respective information processing systems 100A and 100B configured in accordance with an illustrative embodiment. The information processing systems 100A and 100B are assumed to be built on at least one processing platform and provide functionality for iterative application of a machine learning-based information extraction model to documents having unstructured text data.

The information processing system 100A of FIG. 1A includes an enterprise repair center 102A and a plurality of client devices 104-1, 104-2, ... 104-M (collectively client devices 104). The enterprise repair center 102A and client devices 104 are coupled to a network 106. Also coupled to the network 106 is a document database 108, which may store various information relating to documents such as tech support call and chat logs associated with assets of an information technology (IT) infrastructure 110A also coupled to the network 106. Such tech support call and chat logs are assumed to be analyzed by a machine learning-based troubleshooting system 112A of the enterprise repair center 102A, so as to generate recommendations for repair actions to be performed on such assets. The assets may include, by way of example, physical and virtual computing resources in the IT infrastructure 110A. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as virtual machines (VMs), containers, etc.

The client devices 104 in some embodiments comprise respective computers associated with a particular company, organization or other enterprise. In addition, at least portions of the system 100A (and system 100B) may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The document database 108, as discussed above, is configured to store and record information relating to documents to be analyzed by the enterprise repair center 102A (e.g., by the machine learning-based troubleshooting system 112A thereof). Such information may include documents themselves (e.g., tech support call and chat logs, sales documents, articles, etc.) as well as metadata associated with the documents. The metadata may include, for example, a domain associated with a particular document, questions or information to be extracted therefrom, etc. The document database 108 may also store information utilized for training one or more machine learning models (e.g., such as an extractive question answering deep learning model) as described in further detail elsewhere herein. The document database 108 in some embodiments is implemented using one or more storage systems or devices associated with the enterprise repair center 102A. In some embodiments, one or more of the storage systems utilized to implement the document database 108 comprises a scale-out all-flash content addressable storage array or other type of storage array.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1A, one or more input-output devices such as keyboards, displays or other types of input-output devices may be used to support one or more user interfaces to the enterprise repair center 102A and machine learning-based troubleshooting system 112A, as well as to support communication between the enterprise repair center 102A, the machine learning-based troubleshooting system 112A, and other related systems and devices not explicitly shown.

In some embodiments, the client devices 104 are configured to access or otherwise utilize the IT infrastructure 110A. The IT infrastructure 110A may comprise a plurality of assets (e.g., physical or virtual computing resources) of a business, entity or other enterprise. In such cases, the client devices 104 may be associated with repair technicians, system administrators, IT managers or other authorized personnel or users configured to access and utilize the machine learning-based troubleshooting system 112A of the enterprise repair center 102A to troubleshoot errors encountered by assets of the enterprise system 110A. For example, a given one of the client devices 104 may be operated by a mobile technician that travels to a physical location of an asset to be repaired in the IT infrastructure 110A (e.g., an office, a data center, etc. in which assets of the IT infrastructure 110A are located). The given client device 104 may be used by the repair technician to access a graphical user interface (GUI) provided by the machine learning-based troubleshooting system 112A to input symptom sets and other information regarding the asset to be repaired (e.g., such as in the form of unstructured text data, including but not limited to chat and call logs), and to receive recommendations for troubleshooting actions to be performed on the asset to be repaired. It should be noted that "repair" should be construed broadly, and includes various types of actions taken to remedy a particular error or other symptoms encountered on an asset. The repair may include changing settings of the assets, modifying (e.g., removing, installing, upgrading, etc.) software on the asset, modifying (e.g., removing, installing, replacing, etc.) hardware on the asset, etc.

The term "user" herein is intended to be broadly construed so as to encompass numerous arrangements of human, hardware, software or firmware entities, as well as combinations of such entities.

The machine learning-based troubleshooting system 112A may be provided as a cloud service accessible by the given client device 104 to allow the technician to perform troubleshooting on-site. Alternatively, assets of the IT infrastructure 110A to be repaired may be provided to a repair depot or other physical site, where technicians utilizing the client devices 104 can perform troubleshooting of the assets using the machine learning-based troubleshooting system 112A of the enterprise repair center 102A.

In some embodiments, the client devices 104 may implement host agents that are configured for automated transmission of information regarding assets to be repaired to the machine learning-based troubleshooting system 112A, and to automatically receive recommendations for troubleshooting actions to be performed on the assets to be repaired. In some cases, the troubleshooting actions to be performed may be fully automated, such as by initiating certain diagnostic tests, software component modifications, etc. In other cases, the troubleshooting actions to be performed may require manual input, such as in replacing hardware components of an asset to be repaired. It should be noted, however, that even actions such as replacing the hardware components may be automated through the use of robotics at the enterprise repair center 102 if desired.

It should be noted that a "host agent" as this term is generally used herein may comprise an automated entity, such as a software entity running on a processing device. Accordingly, a security agent or host agent need not be a human entity.

As shown in FIG. 1A, the enterprise repair center 102A comprises the machine learning-based troubleshooting system 112A. As will be described in further detail below, the machine learning-based troubleshooting system 112A is configured to iteratively apply a machine learning-based information extraction model to documents having unstructured text data.

Although shown as an element of the enterprise repair center 102A in this embodiment, the machine learning-based troubleshooting system 112A in other embodiments can be implemented at least in part externally to the enterprise repair center 102A, for example, as a stand-alone server, set of servers or other type of system coupled to the network 106. In some embodiments, the machine learning-based troubleshooting system 112A may be implemented at least in part within one or more of the client devices 104.

The machine learning-based troubleshooting system 112A in the FIG. 1A embodiment is assumed to be implemented using at least one processing device. Each such processing device generally comprises at least one processor and an associated memory, and implements one or more functional modules for controlling certain features of the machine learning-based troubleshooting system 112A. In the FIG. 1A embodiment, the machine learning-based troubleshooting system 112A comprises a document parsing module 114A, a recursive information extraction module 116A, and a troubleshoot action recommendation module 118A.

The document parsing module 114A is configured to receive a query to extract information from a document, where the document comprises unstructured text data associated with a given asset of the IT infrastructure 110A (e.g., the document may comprise a tech support call or chat log associated with the given asset of the IT infrastructure 110A).

The recursive information extraction module 116A is configured to perform two or more iterations of utilizing a machine learning-based information extraction model (e.g., an extractive question and answering model) to extract portions (e.g., fragments or phrases of sentences) of unstructured text data from the document. In each of the two or more iterations, the machine learning-based information extraction model provides as output a portion of the unstructured text data extracted from the document and a relevance score associated with the portion of the unstructured text data extracted from the document in that iteration. In a first one of the two or more iterations, the machine learning-based information extraction model takes as input the query and the document. In subsequent ones of the two or more iterations, the machine learning-based information extraction model takes as input the query and a modified version of the document with one or more portions of the unstructured text data of the document extracted in one or more previous ones of the two or more iterations removed therefrom.

The troubleshooting action recommendation module 118A is configured to determine whether the portions of the unstructured text data extracted from the document in the two or more iterations have an associated relevance score exceeding a threshold relevance score and at least a threshold level of similarity to the query and to generate a response to the query where the response to the query comprises a subset (e.g., with pertinent information remaining) of the portions of the unstructured text data extracted from the document in the two or more iterations determined to have associated relevance scores exceeding the threshold relevance score and at least the threshold level of similarity to the query. The troubleshooting action recommendation module 118A is further configured to identify a recommended troubleshooting action for the given asset based at least in part on the response to the query, and to perform the recommended troubleshooting action on the given asset.

It is to be understood that the particular set of elements shown in FIG. 1A for iterative application of a machine learning-based information extraction model to documents having unstructured text data is presented by way of illustrative example only, and in other embodiments additional or alternative elements may be used. Thus, another embodiment may include additional or alternative systems, devices and other network entities, as well as different arrangements of modules and other components.

By way of example, in other embodiments, the machine learning-based troubleshooting system 112A may be implemented external to enterprise repair center 102A, such that the enterprise repair center 102A can be eliminated. The machine learning-based troubleshooting system 112A may also be viewed more generally as an example of a document processing service. FIG. 1B, for example, shows an information processing system 100B that is similar to the information processing system 100A, but where the enterprise repair center 102A is replaced with a document summarization system 102B and the machine learning-based troubleshooting system 112A is replaced with a machine learning-based document processing service 112B. In the information processing system 100B, the IT infrastructure 110A is also replaced with document sources 110B. The document sources 110B are assumed to be sources of documents that are to be summarized by the document summarization system 102B utilizing the machine learning-based document processing service 112B. In some embodiments, one or more of the document sources 110B may comprise assets of an IT infrastructure.

The machine learning-based document processing service 112B, similar to the machine learning-based troubleshooting system 112A, is configured to iteratively apply a machine learning-based information extraction model to documents having unstructured text data. Although shown as an element of the document summarization system 102B in this embodiment, the machine learning-based document processing service 112B in other embodiments can be implemented at least in part externally to the document summarization system 102B, for example, as a stand-alone server, set of servers or other type of system coupled to the network 106. In some embodiments, the machine learning-based document processing service 112B may be implemented at least in part within one or more of the client devices 104.

The machine learning-based document processing service 112B, similar to the machine learning based troubleshooting system 112A, is assumed to be implemented using at least one processing device. Each such processing device generally comprises at least one processor and an associated memory, and implements one or more functional modules for controlling certain features of the machine learning-based document processing service 112B. In the FIG. 1B embodiment, the machine learning-based document processing system 112B comprises a document parsing module 114B, a recursive information extraction module 116B, and a document summary generation module 118B. The modules 114B and 116B provide functionality similar to that described above with respect to the modules 114A and 116A, though the type of document being processed is different in each case. For example, whereas the modules 114A and 116A of the machine learning-based troubleshooting system 112A are assumed to process documents that comprise tech support or chat logs associated with troubleshooting assets of the IT infrastructure 110A, the modules 114B and 116B of the machine learning-based document processing service 112B may process other types of documents such as news articles, request for proposals (RFPs), research or technical papers, etc. that are provided from document sources 110B.

The document summary generation module 118B of the machine learning-based document processing service 112B, similar to the troubleshooting action recommendation module 118A of the machine learning based troubleshooting system 112A, is configured to determine whether the portions of the unstructured text data extracted from the document in the two or more iterations (e.g., performed using the module 116B) have an associated relevance score exceeding a threshold relevance score and at least a threshold level of similarity to the query and to generate a response to the query where the response to the query comprises a subset (e.g., with pertinent information remaining) of the portions of the unstructured text data extracted from the document in the two or more iterations determined to have associated relevance scores exceeding the threshold relevance score and at least the threshold level of similarity to the query.

Whereas the troubleshooting action recommendation module 118A of the machine learning-based troubleshooting system 112A uses the query to identify recommended troubleshooting actions, the document summary generation module 118B of the machine learning-based document processing service 112B is configured to use the query to generate a summary of a document, which may be provided to one or more requesting users (e.g., associated with one or more of the client devices 104). The generated document summary may also be provided as part of alerts or notifications delivered via host agents as described above.

It is to be appreciated that the particular arrangement of the enterprise repair center 102A, machine learning-based troubleshooting system 112A, the document parsing module 114A, the recursive information extraction module 116A, and the troubleshooting action recommendation module 118A illustrated in the FIG. 1A embodiment, as well as the particular arrangement of the document summarization system 102B, machine learning-based document processing service 112B, the document parsing module 114B, the recursive information extraction module 116B, and the document summary generation module 118B illustrated in the FIG. 1B embodiment, are presented by way of example only, and alternative arrangements can be used in other embodiments. As discussed above, for example, the enterprise repair center 102A, the machine learning-based troubleshooting system 112A, the document parsing module 114A, the recursive information extraction module 116A, and the troubleshooting action recommendation module 118A (and, similarly, the document summarization system 102B, machine learning-based document processing service 112B, the document parsing module 114B, the recursive information extraction module 116B, and the document summary generation module 118B) may in some embodiments be implemented internal to one or more of the client devices 104. As another example, the functionality associated with the document parsing module 114A, the recursive information extraction module 116A, and the troubleshoot action recommendation module 118A (or, similarly, the document parsing module 114B, the recursive information extraction module 116B, and the document summary generation module 118B) may be combined into one module, or separated across more than three modules with the multiple modules possibly being implemented with multiple distinct processors or processing devices.

At least portions of the machine learning-based troubleshooting system 112A (e.g., the document parsing module 114A, the recursive information extraction module 116A, and the troubleshooting action recommendation module 118A) and the machine learning-based document processing service 112B (e.g., the document parsing module 114B, the recursive information extraction module 116B, and the document summary generation module 118B) may be implemented at least in part in the form of software that is stored in memory and executed by a processor.

The machine learning-based troubleshooting system 112A and machine learning-based document processing service 112B, and other portions of the systems 100A and 100B, may in some embodiments be part of cloud infrastructure as will be described in further detail below. The cloud infrastructure hosting the machine learning-based troubleshooting system 112A or the machine learning-based document processing service 112B may also host any combination of one or more of the client devices 104, the document database 108, the IT infrastructure 110A or document sources 110B, etc.

The machine learning-based troubleshooting system 112A and machine learning-based document processing service 112B, and other components of the information processing systems 100A and 100B in the FIG. 1A and FIG. 1B embodiments, are assumed to be implemented using at least one processing platform comprising one or more processing devices each having a processor coupled to a memory. Such processing devices can illustratively include particular arrangements of compute, storage and network resources.

The client devices 104 and machine learning-based troubleshooting system 112A or machine learning-based document processing service 112B, or components thereof (e.g., the modules 114A, 116A, 118A, 114B, 116B and 118B) may be implemented on respective distinct processing platforms, although numerous other arrangements are possible. For example, in some embodiments at least portions of the machine learning-based troubleshooting system 112A or the machine learning-based document processing service 112B and one or more of the client devices 104 are implemented on the same processing platform. A given client device (e.g., 104-1) can therefore be implemented at least in part within at least one processing platform that implements at least a portion of the machine learning-based troubleshooting system 112A or the machine learning-based document processing service 112B.

The term "processing platform" as used herein is intended to be broadly construed so as to encompass, by way of illustration and without limitation, multiple sets of processing devices and associated storage systems that are configured to communicate over one or more networks. For example, distributed implementations of the systems 100A and 100B are possible, in which certain components of the system reside in one data center in a first geographic location while other components of the system reside in one or more other data centers in one or more other geographic locations that are potentially remote from the first geographic location. Thus, it is possible in some implementations of the systems 100A and 100B for the client devices 104, machine learning-based troubleshooting system 112A or machine learning-based document processing service 112B, or portions or components thereof, to reside in different data centers. Numerous other distributed implementations are possible. The machine learning-based troubleshooting system 112A or machine learning-based document processing service 112B can also be implemented in a distributed manner across multiple data centers.

Additional examples of processing platforms utilized to implement the machine learning-based troubleshooting system 112A and the machine learning-based document processing service 112B in illustrative embodiments will be described in more detail below in conjunction with FIGS. 14 and 15.

It is to be appreciated that these and other features of illustrative embodiments are presented by way of example only and should not be construed as limiting in any way.

An exemplary process for iterative application of a machine learning-based information extraction model to documents having unstructured text data will now be described in more detail with reference to the flow diagram of FIG. 2. It is to be understood that this particular process is only an example, and that additional or alternative processes for iterative application of a machine learning-based information extraction model to documents having unstructured text data can be carried out in other embodiments.

In this embodiment, the process includes steps 200 through 206. These steps are assumed to be performed by the machine learning-based troubleshooting system 112A utilizing the document parsing module 114A, the recursive information extraction module 116A, and the troubleshooting action recommendation module 118A, or by the machine learning-based document processing service 112B utilizing the document parsing module 114B, the recursive information extraction module 116B and the document summary generation module 118B. The process begins with step 200, receiving a query to extract information from a document. The document comprises unstructured text data. In the context of the system 100A, the document and its unstructured text data may be associated with a given asset of IT infrastructure. For example, the document may comprise at least one of one or more support chat logs and one or more support call logs for a problem encountered on the given asset. In the context of the system 100B, the document may be an article, request for proposal (RFP), research or technical paper, etc. More generally, it should be appreciated that the FIG. 2 process may be performed for any type of document having unstructured text data for which it is desired to extract information therefrom.

In step 202, two or more iterations of utilizing a machine learning-based information extraction model are performed to extract portions (e.g., fragments or phrases of sentences) of the unstructured text data from the document. In each of the two or more iterations, the machine learning-based information extraction model provides as output a portion of the unstructured text data extracted from the document and a relevance score associated with the portion of the unstructured text data extracted from the document in that iteration. In a first one of the two or more iterations, the machine learning-based information extraction model takes as input the query and the document. In subsequent ones of the two or more iterations, the machine learning-based information extraction model takes as input the query and a modified version of the document with one or more portions of the unstructured text data of the document extracted in one or more previous ones of the two or more iterations removed therefrom. In other words, the machine learning-based information extraction model is applied in a recursive manner, where the unstructured text data extracted in a previous iteration is removed from the document provided as input in a subsequent iteration. In some embodiments, portions of the unstructured text data in the document that exhibit at least a threshold level of similarity to the portions of the unstructured text data extracted from the document provided as output by the machine learning-based information extraction model are also removed.

The machine learning-based information extraction model utilized in step 202 may comprise a question answering natural language processing model which can be based on a Bidirectional Encoder Representations from Transformers (BERT) model. Step 202 may include performing the two or more iterations until one or more designated stop conditions are reached, such as on reaching a threshold number of iterations, determining that the relevance score for a portion of the unstructured text data extracted from the document has a relevance score at or below a threshold relevance score.

Figure 2:
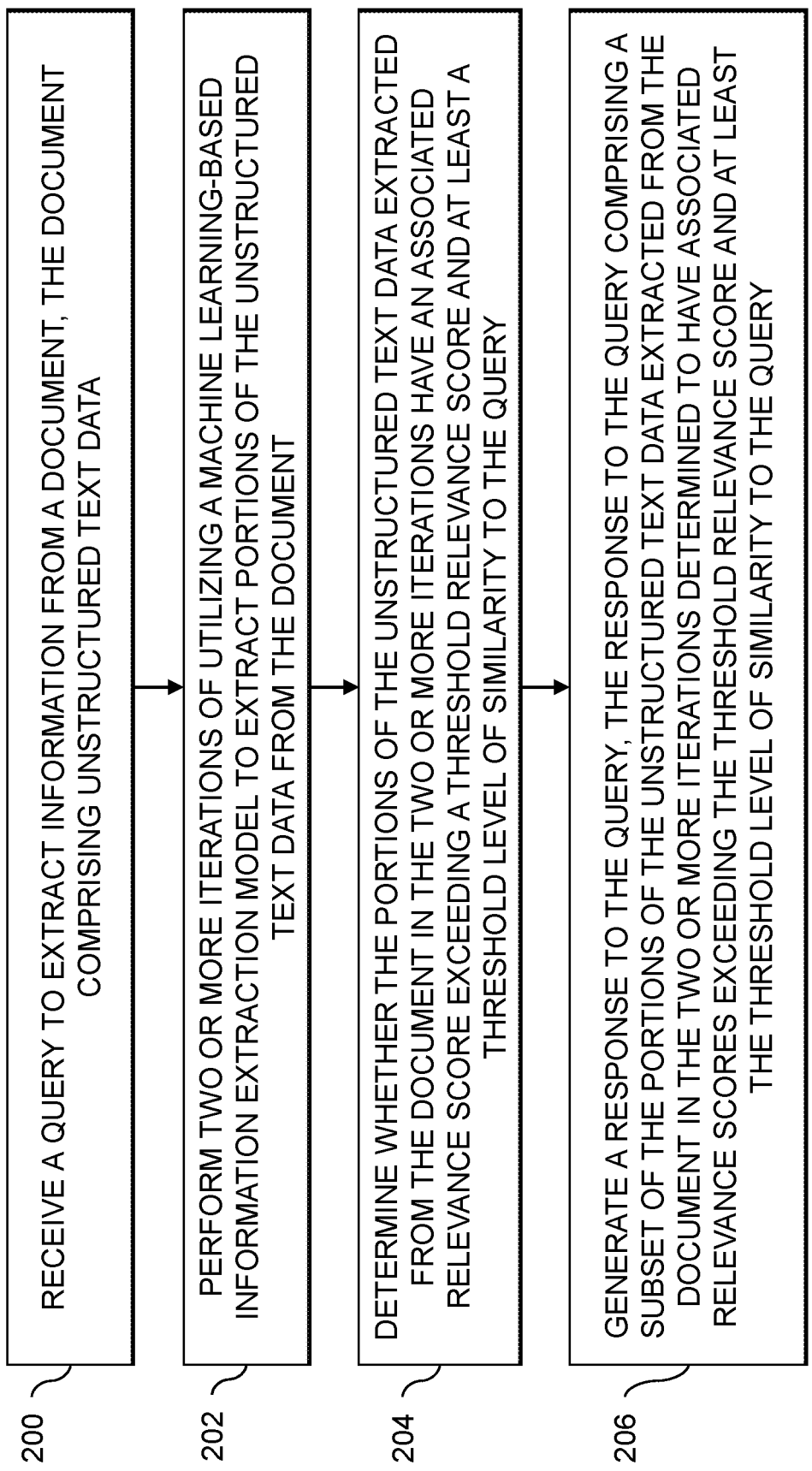
FIG. 2 is a flow diagram of an exemplary process for iterative application of a machine learning-based information extraction model to documents having unstructured text data in an illustrative embodiment.

The FIG. 2 process continues with determining whether the portions of the unstructured text data extracted from the document in the two or more iterations have an associated relevance score exceeding a threshold relevance score and at least a threshold level of similarity to the query in step 204. A response to the query is generated in step 206, where the response to the query comprises a subset (e.g., with pertinent information remaining) of the portions of the unstructured text data extracted from the document in the two or more iterations determined to have associated relevance scores exceeding the threshold relevance score and at least the threshold level of similarity to the query. The subset of the portions of the unstructured text data of the document extracted in the two or more iterations may further have a length that exceeds a threshold length.

Step 206 may include determining whether a given portion of unstructured text data extracted from the document in a given iteration has at least the threshold level of similarity to the query by converting the query and the given portion of unstructured text data into respective first and second document vectors, calculating a similarity score between the first and second document vectors, appending the given portion of unstructured text data to the response to the query when the calculated similarity score is greater than or equal to a designated similarity threshold, and refraining from appending the given portion of unstructured text data to the response to the query when the calculated similarity score is below the designated similarity threshold. Converting the query and the given portion of unstructured text data into respective first and second vectors may comprise utilizing at least one of a distributed memory model of paragraph vectors (PV-DM) and a distributed bag of words model of paragraph vectors (PV-DBOW), both of which are types of Doc2Vec models. In some embodiments, a cosine similarity between the first and second document vectors is calculated. The cosine similarity represents one minus a cosine distance, and thus may be used to derive a distance score between the first and second document vectors. It should be noted that references herein to calculating similarity scores and determining whether calculated similarity scores are at or above a designated similarity threshold corresponds to calculating distance scores and determining whether the calculated distance scores are at or below a designated distance threshold.

In the context of system 100A, the FIG. 2 process may continue after step 206 with identifying a recommended troubleshooting action for the given asset based at least in part on the response to the query. The recommended troubleshooting action may then be performed on the given asset. The recommended troubleshooting action may comprise at least one of a diagnostic action and a repair action. The given asset may comprise a computing device, and the recommended troubleshooting action may comprise modifying at least one of one or more software components of the computing device and one or more hardware components of the computing device.

In the context of system 100B, the FIG. 2 process may continue after step 206 with generating a summary of the document based at least in part on the response to the query. This summary may be provided to a requesting user, may be included in an alert or notification delivered using a host agent, etc.

In various use case scenarios, there is a need to process large amounts of unstructured text data. Various embodiments are described below with respect to use cases in support contexts where there are significant technical challenges associated with effectively utilizing textual and/or audio transcripts (e.g., call logs, chat logs, etc.) of conversations between customers or other end-users and support agents as they work through resolving a problem. Interactions between customers and support agents (or downstream repair technicians in the case of hardware and software troubleshooting of IT assets) may be stored word for word in an unstructured manner, based on random input from the customers as they describe problems encountered to the support agents. There may be significant variation that occurs as different support agents may use different text (e.g., different phrasing, different series of diagnostic and repair actions, etc.) to describe how they resolve customer problems. Unstructured text data poses additional challenges for state-of-the-art natural language processing (NLP) techniques. The difficulty remains in extracting only the pertinent information from text that is both noisy and unstructured.

Illustrative embodiments provide techniques for removing unwanted noise from unstructured text data while preserving pertinent information. Such techniques have various applications, such as in extracting pertinent information from tech support call or chat logs, sales documents, news articles, etc. Using the techniques described herein, significant improvements are provided in data processing systems as expensive and time-consuming manual processes are replaced by automated processing. The automated processing provides additional advantages as manual processing of unstructured text data can be error-prone, cumbersome and costly to implement. For example, an enterprise or other entity may seek to utilize call or chat transcripts as inputs for decision making in machine learning applications. Errors made during processing of the unstructured text data will degrade the accuracy of the machine learning model, which impacts effectiveness of various downstream processes.

Conventional machine learning-based NLP techniques achieve limited success when the input is unstructured text data. Additional processing using manual scrubbing is usually required, and results in subjective interpretation, increased variation and error. Some embodiments advantageously provide objective interpretation which removes variation and is consistent in its output through a novel application of deep learning techniques. This provides various improvements relative to conventional NLP techniques such as pattern matching, summarization, and extractive question answering models. Pattern matching to extract information and remove unwanted noise from unstructured text data requires a lot of hand-crafted rules which need to be regularly updated. Summarization techniques using machine learning models summarize information in unstructured text data. Summarization, however, may result in some signals being lost especially if the goal is to feed information to a downstream NLP or text processing model. Conventional extractive question answering deep learning models provide pre-trained models that provide answers in short phrases (e.g., typically four words or less) and thus may result in loss of information.

In some embodiments, an extractive question answering deep learning model is applied recursively in multiple iterations for a given input text to extract the most pertinent information therefrom. By isolating the most pertinent information from unwanted or noisy text, such embodiments enable more precise messaging into downstream NLP applications. Some embodiments provide techniques for extracting the most pertinent information from any text data irrespective of the domain from which the data originated. To do so, some embodiments provide a unique solution of applying an extractive question answering deep learning model in a recursive manner that removes prior answer from a corpus, combined with additional validity checks (e.g., using document vector techniques). In this way, embodiments provide solutions which result in significantly more accurate and complete information as compared to using an extractive question answering deep learning model alone, as will be described in further detail below with respect to FIGS. 10A and 10B.

Figure 3:
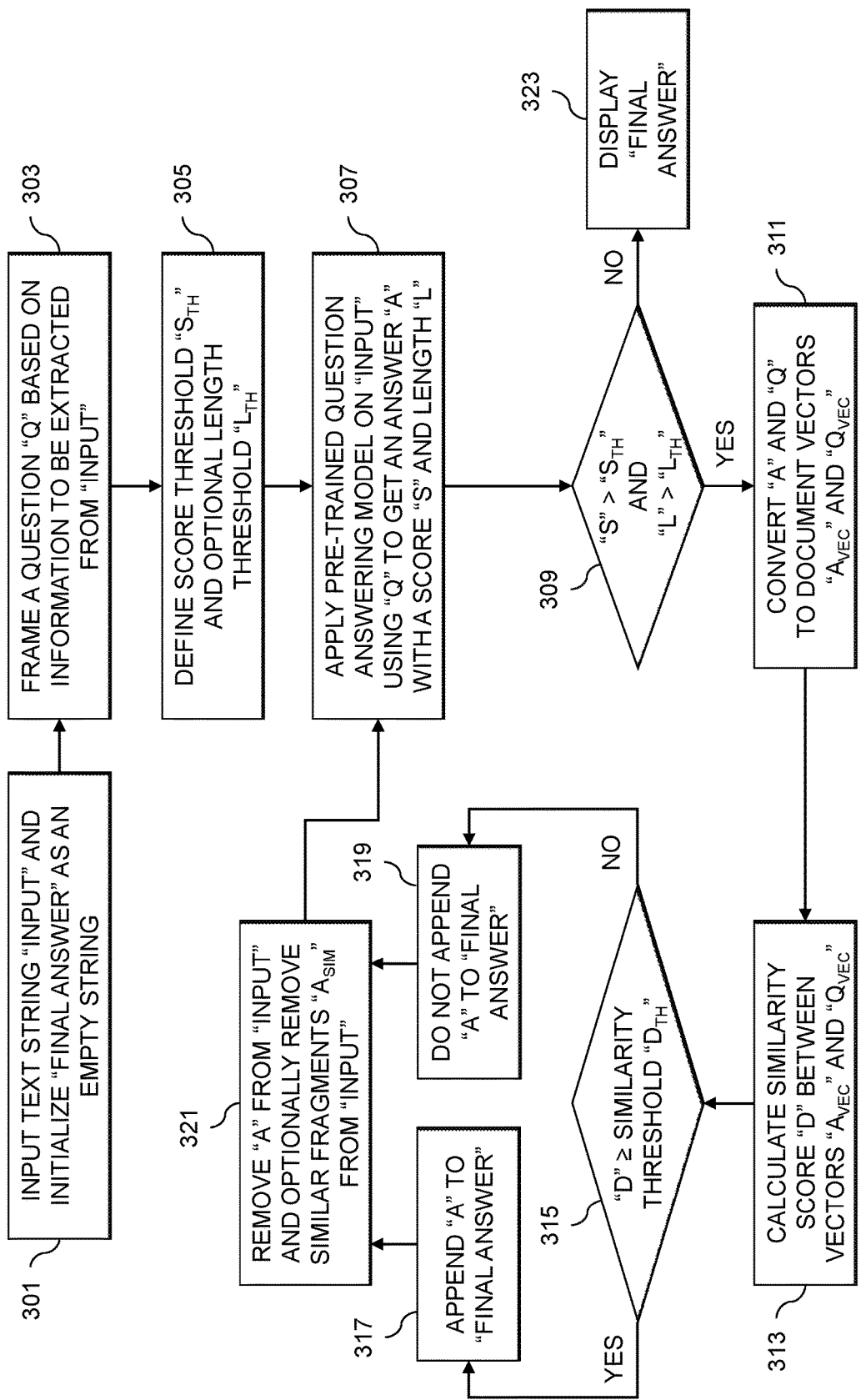
FIG. 3 shows a process flow for recursive application of a question answering deep learning model in an illustrative embodiment.

FIG. 3 shows a process flow for recursive application of a question answering deep learning model. In block 301, a text string "INPUT" is provided, and an empty string "FINAL ANSWER" is initialized. The text string INPUT is assumed to comprise unstructured text data that an answer is to be extracted from in the form of FINAL ANSWER. In some embodiments, some preprocessing is applied to INPUT, such as performing normalization, recognizing words, etc. A question "Q" is framed in block 303, based on information to be extracted from INPUT. In block 305, a score threshold "$S_{TH}$" is defined. Block 305 may also include defining an optional length threshold "$L_{TH}$." The score threshold $S_{TH}$ is used to filter results from a question answering model such that the answer extracted therefrom in a particular iteration has some threshold relevance to the question Q. The length threshold $L_{TH}$ ensures that the extracted answers have some minimum length (e.g., such as 5 words). The exact length value of $L_{TH}$ may be selected based on the domain of the unstructured text in INPUT. Use of the optional length threshold $L_{TH}$ may improve the quality of the output in FINAL ANSWER.

In block 307, a pre-trained question answering model is applied to INPUT using Q to get an answer "A" with an associated score "S" and length "L." A determination is made in block 309 as to whether $S>S_{TH}$ and, if the optional length threshold $L_{TH}$ is defined, whether $L>L_{TH}$. If the result of the step 309 determination is yes, processing proceeds to block 311 where A and Q are converted to document vectors "$A_{VEC}$" and "$Q_{VEC}$" respectively. Block 311 may utilize the Doc2Vec model, where the Doc2Vec model is trained on a suitable corpus for the domain of the input text string. For example, if INPUT comprises a call or chat support log, the Doc2Vec model may be trained on a set of historical call or chat support logs (e.g., 100,000 call logs). It should be appreciated that embodiments are not limited solely to use with the Doc2Vec model. Various other tools and models may be used, such as the BERT language model. In block 313, a similarity score "D" is calculated between the document vectors $A_{VEC}$ and $Q_{VEC}$. A determination is made in block 315 as to whether D is greater than or equal to a specified similarity threshold "$D_{TH}$." If the result of the block 315 determination is yes, processing proceeds to block 317 where A is appended to FINAL ANSWER. If the result of the block 315 determination is no, processing proceeds to block 319 where A is not appended to FINAL ANSWER. The various thresholds (e.g., $S_{TH}$, $L_{TH}$, $D_{TH}$, etc.) may be set or decided based on the domain of the input text string.

Following blocks 317 and 319, processing proceeds to block 321. In block 321, A is removed from INPUT. Optionally, block 321 also includes removing similar fragments "$A_{SIM}$" from INPUT. The similar fragments $A_{SIM}$ comprise text fragments in INPUT with a designated threshold level of similarity to A. It should be noted that removing the similar fragments $A_{SIM}$ is an optional step that may help to avoid duplicate entries in FINAL ANSWER. In some embodiments, instead of removing the similar fragments $A_{SIM}$ in block 321, post-processing is applied to FINAL ANSWER to remove duplicate entries therefrom. After block 321, processing returns to block 307, and blocks 309 through 321 are repeated in a recursive manner. The answer A output from the question answering model in each iteration is removed from INPUT such that in subsequent iterations the INPUT is altered and new answers are obtained from application of the pre-trained question answering model in block 307. Iterations proceed until the result of the block 309 determination is no. When the result of the block 309 determination is no, the FINAL ANSWER is output in block 323. As noted above, in some embodiments some post-processing may be applied to the FINAL ANSWER. Such post-processing may include removing duplicate entries, reordering the output (e.g., based on the sequence in which the fragments A occur in the original text of INPUT), etc.

FIG. 4 shows an example of unstructured text data 400 suitable for use as the input text string INPUT in the FIG. 3 process flow. The unstructured text data 400 is associated with a tech support logs domain, and has a question Q of "What is the issue?" and a threshold score $S_{TH}$ of 0.0001. FIGS. 5A and 5B illustrate the result of iterations 1, 2, 3 and 19 for the unstructured text data 400 utilizing the FIG. 3 process flow with the question "What is the issue?". In iteration 1, the answer A is "No POST" which has an associated score S (0.426639767) exceeding the threshold score $S_{TH}$ (0.0001) and a similarity score D between the document vector of the extracted answer and the document vector of the question that is greater than or equal to the designated similarity threshold $D_{TH}$. In iteration 2, the answer A is "Customer said that he is getting a black screen after turning on the computer" which also has an associated score S (0.032062736) exceeding the threshold score $S_{TH}$ and a similarity score D between the document vector of the extracted answer and the document vector of the question that is greater than or equal to the designated similarity threshold $D_{TH}$. In iteration 3, the answer A is "The power button and the keyboard lights up" which also has an associated score S (0.09033893) exceeding the threshold score $S_{TH}$ and a similarity score D between the document vector of the extracted answer and the document vector of the question that is greater than or equal to the designated similarity threshold $D_{TH}$. In iteration 19, the answer A is "Email address obtained and updated in service record" which also has an associated score S (0.188590471957926) exceeding the threshold score $S_{TH}$ but a similarity score D between the document vector of the extracted answer and the document vector of the question that is less than the designated similarity threshold $D_{TH}$. Accordingly, the answer from iteration 19 will not be included in the final answer.

FIGS. 6A-6C show respective portions 600-1, 600-2, 600-3 (collectively, 600) of a table that summarizes the recursive application of the question answering deep learning model with the question Q of "What is the issue?". The table 600 includes columns for iteration number, extracted answer A, score S, and validity (e.g., whether $D>D_{TH}$). FIG. 6D shows an example output final answer 605 that is formed by concatenating the extracted answers that are determined to be valid from the table 600. It should be appreciated that the extracted answers and resulting output is based on the specified question Q. FIGS. 6A-6D, for example, illustrate the results of iterations performing using the question "What is the issue?". FIGS. 7A and 7B show respective portions 700-1 and 700-2 (collectively, 700) of a table showing the results of iterations performed using the question "What is the problem?" and FIGS. 8A and 8B show respective portions 800-1 and 800-2 (collectively, 800) of a table showing the results of iterations performed using the question "What is the trouble?". As illustrated by the tables 600, 700 and 800, the response or output is similar when rephrasing the input question Q.

Another example application of the FIG. 3 process flow is illustrated in FIGS. 9A and 9B. FIG. 9A shows unstructured text data 900 that is used as the input text string. The unstructured text data 900, similar to unstructured text data 400, is in the domain of tech support logs and uses a question Q of "What is the issue?" with a threshold score $S_{TH}$ of 0.0001. FIG. 9B shows a table 905 of results of iterations performed using the FIG. 3 process flow on the input text string of the unstructured text data 900. The table 905, in addition to columns for iteration number, extracted answer, score and validity similar to tables 600, 700 and 800, also includes a column for predicted category. In some embodiments, the question answering model output is fed to a suitable text processing model which may provide, in each iteration, not only the answer A and associated score S, but also a categorization of the answer A. In the example of FIG. 9B, the possible categories are symptom, diagnostic action, attribute, and repair action.

As detailed above, illustrative embodiments provide a unique solution that applies an extractive question answering deep learning model in a recursive manner that removes prior answers from the input corpus. Illustrative embodiments further perform additional validity checks on extracted answers using document vector techniques. As a result, illustrative embodiments provide various advantages such as in providing significantly more accurate and complete information relative to conventional techniques that use an extractive question answering deep learning model alone.

FIGS. 10A and 10B demonstrate the improvements of using the extractive question answering model with removal of prior answers relative to using a single pass of an extractive question answering model. In the test, the platform utilized was a Python Huggingface transformers module for the extractive question answering model and a Gensim Model for Doc2Vec. Performance time for the recursive application of the extractive question answering model utilized 6 seconds per iteration, with 5-10 iterations per call log and a total time of 30-60 seconds. Performance time for the single pass application of the extractive question answering model was one iteration with a total time of 5 seconds.

FIG. 10A shows a table 1000 of results obtained from use of the sample input text of unstructured text data 900 in FIG. 9A with the recursive application of the extractive question answering model, along with summary performance results 1005 including a precision of 70% and a recall of 100%. The precision represents the count of extracted informative phrases relative to the total count of extracted phrases, while the recall represents the count of extracted informative phrases relative to the total count of informative phrases. FIG. 10B shows a table 1010 of results obtained from single pass application of the extractive question answering model, along with summary performance results 1015 including a precision of 38% and a recall of 30%. In the table 1010, a validity of "incomplete" is treated as invalid. The extractive question answering model used to obtain the sample results in FIGS. 10A and 10B is a question answering model based on BERT with a Doc2Vec model trained on repair call logs. As demonstrated by FIGS. 10A and 10B, the recursive application of the question answering model extracts more accurate and complete information relative to the non-recursive or single pass application of the extractive question answering model.

A further example of application of the FIG. 3 process flow is illustrated in FIGS. 11-13C. FIG. 11 shows unstructured text data 1100 that is used as the input text string. The unstructured text data 1100 is in the domain of news articles and uses a question Q of "How did Entity_A help the film school?". FIG. 12 shows a table 1200 of results of iterations performed using the FIG. 3 process flow on the input text string of the unstructured text data 1100 with a threshold score $S_{TH}$ of 0.01, along with the final answer 1205 produced therefrom. FIGS. 13A and 13B show portions 1300-1 and 1300-2 of a table 1300 of results of iterations performed using the FIG. 3 process flow on the input text string of the unstructured text data 1100 with a threshold score $S_{TH}$ of 0.001. FIG. 13C shows the resulting final answer 1305 produced therefrom.

In some embodiments, a digital repair process (e.g., as implemented by third-party repair centers associated with an enterprise), may include capability for what is referred to as "swap and test." Swap and test utilizes support call logs as input to a machine learning model that extracts the pertinent information in order to make a part recommendation (or other diagnostic or repair action recommendation) with a high degree of confidence. Using conventional NLP techniques for extracting pertinent information from tech support call logs, however, has an effectiveness of just 40% thereby impacting only 5% of digital repair volume (e.g., 100/day). The techniques described herein, however, enable removal of greater than 80% of unwanted call log noise which effectively doubles the "swap and test" volume to 10% (e.g., 200/day). By increasing pertinent information extraction effectiveness, machine learning model accuracy increases accordingly and impacts a much larger proportion of call logs.

Advantageously, improving the effectiveness of the "swap and test" process can help to reduce customer turn around time (TAT) and streamline repairs by eliminating triage time and reducing part lead time. Global lead times, for example, may vary from 45 minutes to 2 days, as it includes auto-ordering of parts recommended by a machine learning model. When the machine learning model effectiveness or accuracy is suboptimal, the auto-ordering process might recommend the wrong part and negatively increase processing time. As noted above, embodiments are not limited to use in the application area of processing tech support call or chat logs. Embodiments may be used in a wide variety of other application areas, including but not limited to analyzing sales documents, news articles, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for iterative application of a machine learning-based information extraction model to documents having unstructured text data will now be described in greater detail with reference to FIGS. 14 and 15. Although described in the context of system 100, these platforms may also be used to implement at least portions of other information processing systems in other embodiments.

Figure 14:
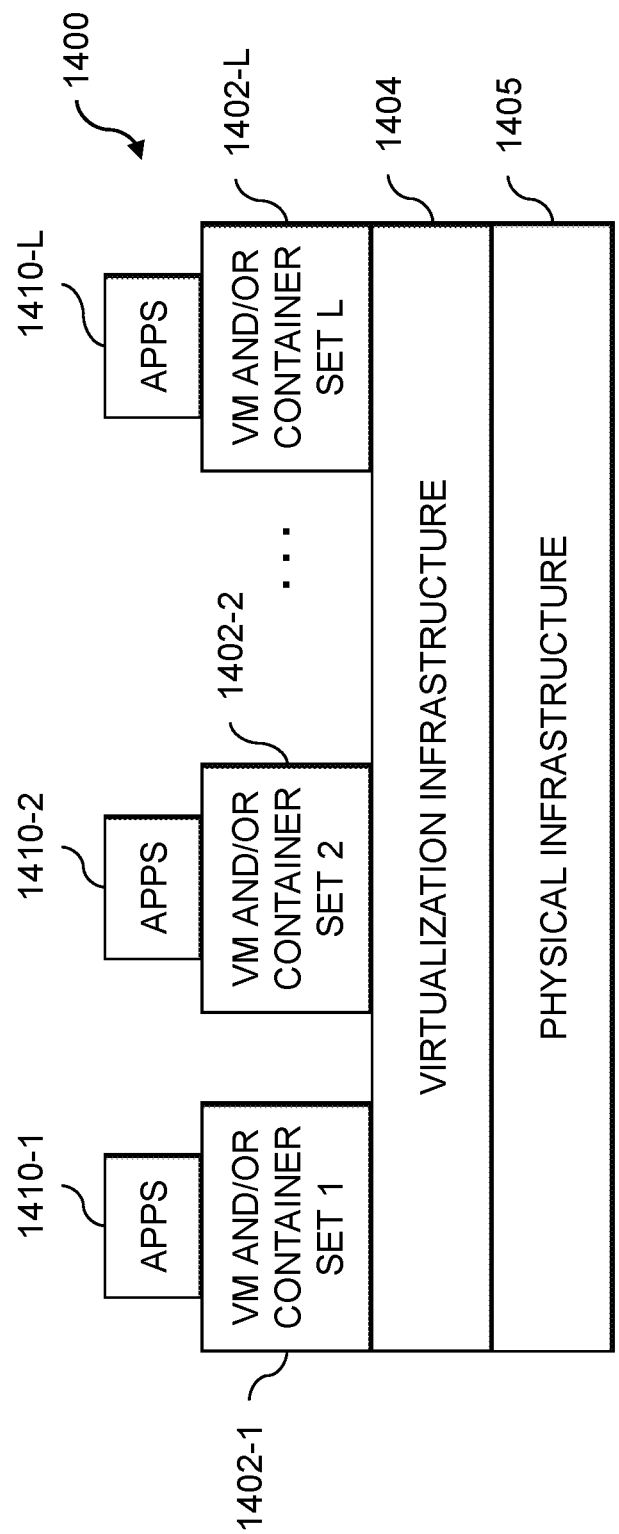
FIGS. 14 and 15 show examples of processing platforms that may be utilized to implement at least a portion of an information processing system in illustrative embodiments.
Figure 15:
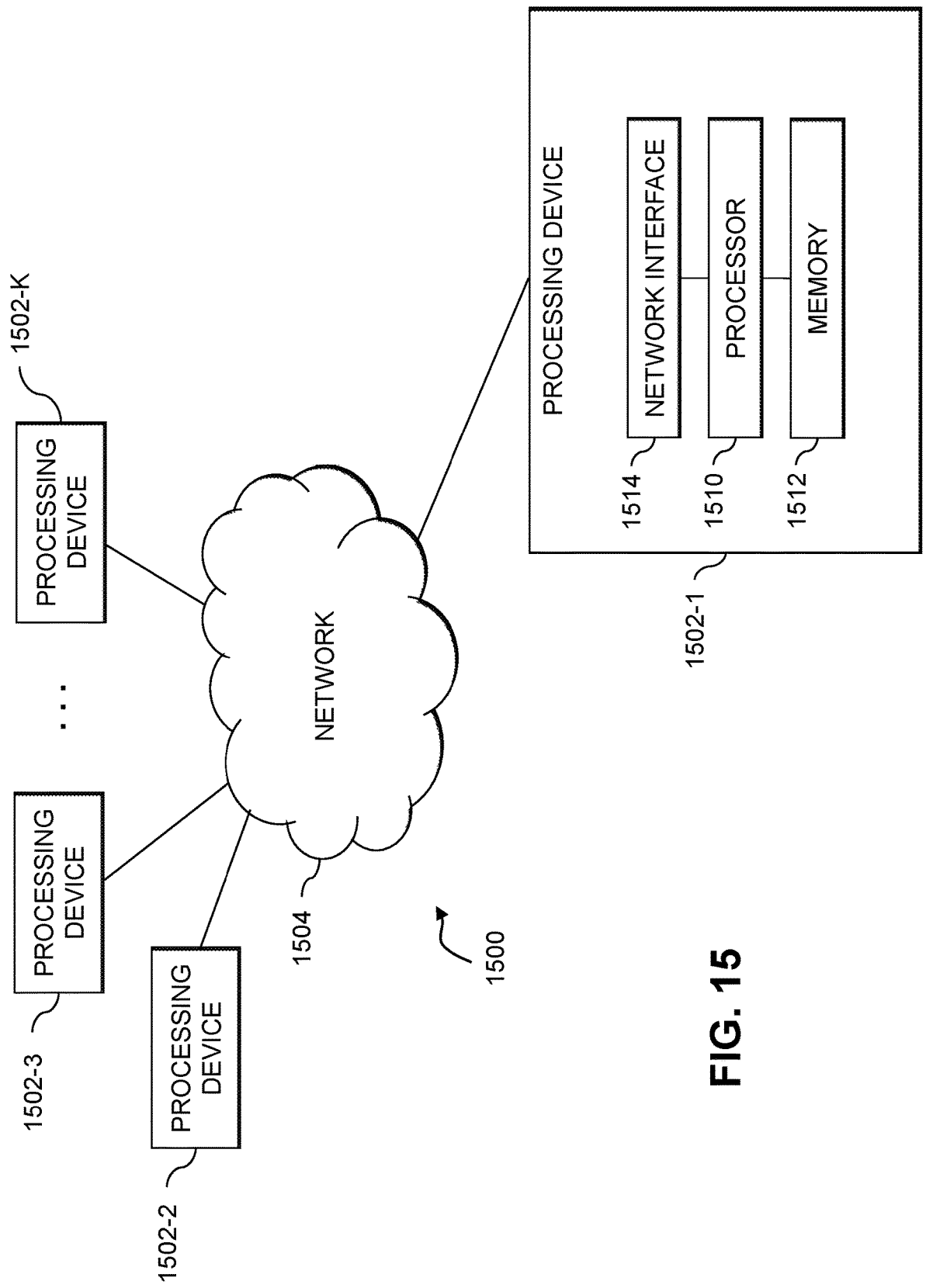

FIG. 14 shows an example processing platform comprising cloud infrastructure 1400. The cloud infrastructure 1400 comprises a combination of physical and virtual processing resources that may be utilized to implement at least a portion of the information processing system 100A in FIG. 1A or the information processing system 100B in FIG. 1B. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100A or system 100B may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100A or system 100B and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100A or system 100B may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for iterative application of a machine learning-based information extraction model to documents having unstructured text data as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, documents, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;

the at least one processing device being configured to perform steps of:

receiving a query to extract information from a document, the document comprising unstructured text data;

performing two or more iterations of utilizing a machine learning-based information extraction model, wherein in each of the two or more iterations the machine learning-based information extraction model provides as output a portion of the unstructured text data extracted from the document and a relevance score associated with the portion of the unstructured text data extracted from the document in that iteration, wherein in a first one of the two or more iterations the machine learning-based information extraction model takes as input the query and the document, and wherein in subsequent ones of the two or more iterations the machine learning-based information extraction model takes as input the query and a modified version of the document, the modified version of the document having one or more portions of the unstructured text data of the document extracted in one or more previous ones of the two or more iterations removed therefrom;

determining whether the portions of the unstructured text data extracted from the document in the two or more iterations have an associated relevance score exceeding a threshold relevance score and at least a threshold level of similarity to the query; and generating summary information characterizing at least a portion of the document as a response to the query, the summary information comprising a subset of the portions of the unstructured text data extracted from the document in the two or more iterations determined to have associated relevance scores exceeding the threshold relevance score and at least the threshold level of similarity to the query.

2. The apparatus of claim 1 wherein the machine learning-based information extraction model comprises a question answering natural language processing model.

3. The apparatus of claim 2 wherein the question answer natural language processing model comprises a bidirectional encoder representations from transformers model.

4. The apparatus of claim 1 wherein performing the two or more iterations comprises performing iterations until one or more designated stop conditions are reached.

5. The apparatus of claim 4 wherein the one or more designated stop conditions comprise:

a threshold number of iterations; and determining that the relevance score for a portion of the unstructured text data extracted from the document has a relevance score at or below the threshold relevance score.

6. The apparatus of claim 1 wherein the subset of the portions of the unstructured text data from the document extracted in the two or more iterations further have a length that exceeds a threshold length.

7. The apparatus of claim 1 wherein determining whether a given portion of unstructured text data extracted from the document in a given iteration has at least the threshold level of similarity to the query comprises:

converting the query and the given portion of unstructured text data into respective first and second document vectors;

calculating a similarity score between the first and second document vectors;

appending the given portion of unstructured text data to the response to the query when the calculated similarity score is at or above a designated similarity threshold; and refraining from appending the given portion of unstructured text data to the summary information when the calculated similarity score is below the designated similarity threshold.

8. The apparatus of claim 7 wherein converting the query and the given portion of unstructured text data into respective first and second vectors comprises utilizing at least one of a distributed memory model of paragraph vectors and a distributed bag of words model of paragraph vectors.

9. The apparatus of claim 7 wherein calculating the similarity score between the first and second document vectors comprises calculating a cosine similarity between the first and second document vectors.

10. The apparatus of claim 1 wherein the modified version of the document used as input to the machine learning-based information extraction model in a given subsequent one of the two or more iterations has the one or more portions of the unstructured text data extracted in one or more previous ones of the two or more iterations removed therefrom and one or more additional portions of the unstructured text data exhibiting a threshold level of similarity to the one or more portions of the unstructured text data extracted in the one or more previous ones of the two or more iterations removed therefrom.

11. The apparatus of claim 1 wherein the document comprises at least one of a support chat log and a support call log associated with a given asset of an information technology infrastructure.

12. The apparatus of claim 11 wherein the at least one processing device is further configured to perform the steps of:

identifying a recommended troubleshooting action for the given asset based at least in part on the response to the query; and performing the recommended troubleshooting action on the given asset.

13. The apparatus of claim 12 wherein the recommended troubleshooting action comprises at least one of a diagnostic action and a repair action.

14. The apparatus of claim 13 wherein the given asset comprises a computing device, and wherein the recommended troubleshooting action comprises modifying at least one of: one or more software components of the computing device; and one or more hardware components of the computing device.

15. A computer program product comprising a non-transitory processor-readable storage medium having stored therein program code of one or more software programs, wherein the program code when executed by at least one processing device causes the at least one processing device to perform steps of:

receiving a query to extract information from a document, the document comprising unstructured text data;

performing two or more iterations of utilizing a machine learning-based information extraction model, wherein in each of the two or more iterations the machine learning-based information extraction model provides as output a portion of the unstructured text data extracted from the document and a relevance score associated with the portion of the unstructured text data extracted from the document in that iteration, wherein in a first one of the two or more iterations the machine learning-based information extraction model takes as input the query and the document, and wherein in subsequent ones of the two or more iterations the machine learning-based information extraction model takes as input the query and a modified version of the document, the modified version of the document having one or more portions of the unstructured text data of the document extracted in one or more previous ones of the two or more iterations removed therefrom;

determining whether the portions of the unstructured text data extracted from the document in the two or more iterations have an associated relevance score exceeding a threshold relevance score and at least a threshold level of similarity to the query; and generating summary information characterizing at least a portion of the document as a response to the query, the summary information comprising a subset of the portions of the unstructured text data extracted from the document in the two or more iterations determined to have associated relevance scores exceeding the threshold relevance score and at least the threshold level of similarity to the query.

16. The computer program product of claim 15 wherein determining whether a given portion of unstructured text data extracted from the document in a given iteration has at least the threshold level of similarity to the query comprises:

converting the query and the given portion of unstructured text data into respective first and second document vectors;

calculating a similarity score between the first and second document vectors;

appending the given portion of unstructured text data to the response to the query when the calculated similarity score is at or above a designated similarity threshold; and refraining from appending the given portion of unstructured text data to the summary information when the calculated similarity score is below the designated similarity threshold.

17. The computer program product of claim 15 wherein the document comprises at least one of a support chat log and a support call log associated with a given asset of an information technology infrastructure, and wherein the program code when executed by the at least one processing device further causes the at least one processing device to perform steps of identifying a recommended troubleshooting action for the given asset based at least in part on the response to the query and performing the recommended troubleshooting action on the given asset.

18. A method comprising:

receiving a query to extract information from a document, the document comprising unstructured text data;

performing two or more iterations of utilizing a machine learning-based information extraction model, wherein in each of the two or more iterations the machine learning-based information extraction model provides as output a portion of the unstructured text data extracted from the document and a relevance score associated with the portion of the unstructured text data extracted from the document in that iteration, wherein in a first one of the two or more iterations the machine learning-based information extraction model takes as input the query and the document, and wherein in subsequent ones of the two or more iterations the machine learning-based information extraction model takes as input the query and a modified version of the document, the modified version of the document having one or more portions of the unstructured text data of the document extracted in one or more previous ones of the two or more iterations removed therefrom;

determining whether the portions of the unstructured text data extracted from the document in the two or more iterations have an associated relevance score exceeding a threshold relevance score and at least a threshold level of similarity to the query; and generating summary information characterizing at least a portion of the document as a response to the query, the summary information comprising a subset of the portions of the unstructured text data extracted from the document in the two or more iterations determined to have associated relevance scores exceeding the threshold relevance score and at least the threshold level of similarity to the query;

wherein the method is performed by at least one processing device comprising a processor coupled to a memory.

19. The method of claim 18 wherein determining whether a given portion of unstructured text data extracted from the document in a given iteration has at least the threshold level of similarity to the query comprises:

converting the query and the given portion of unstructured text data into respective first and second document vectors;

calculating a similarity score between the first and second document vectors;

appending the given portion of unstructured text data to the response to the query when the calculated similarity score is at or above a designated similarity threshold; and refraining from appending the given portion of unstructured text data to the summary information when the calculated similarity score is below the designated similarity threshold.

20. The method of claim 18 wherein the document comprises at least one of a support chat log and a support call log associated with a given asset of an information technology infrastructure, and further comprising identifying a recommended troubleshooting action for the given asset based at least in part on the response to the query and performing the recommended troubleshooting action on the given asset.

* * * * *